United States Patent Office 3,362,080
Patented Jan. 9, 1968

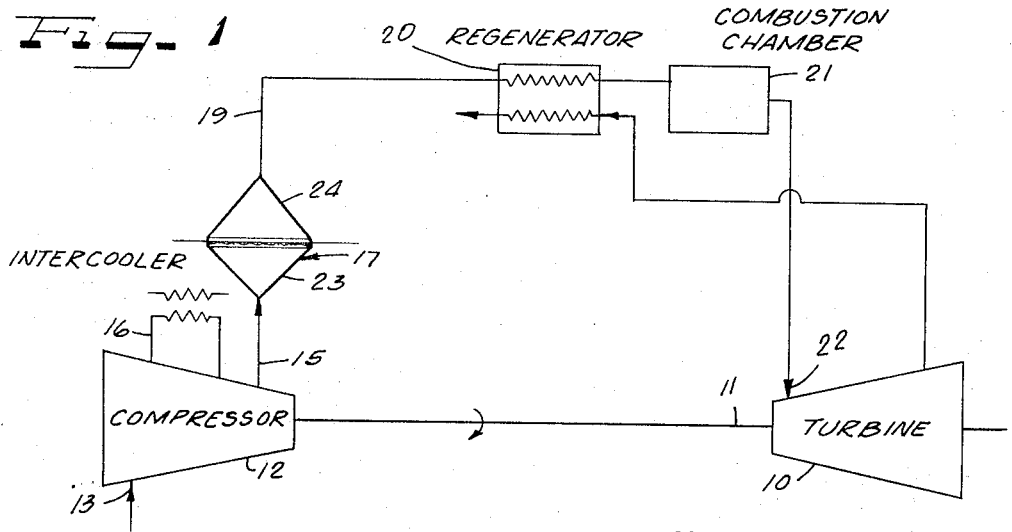
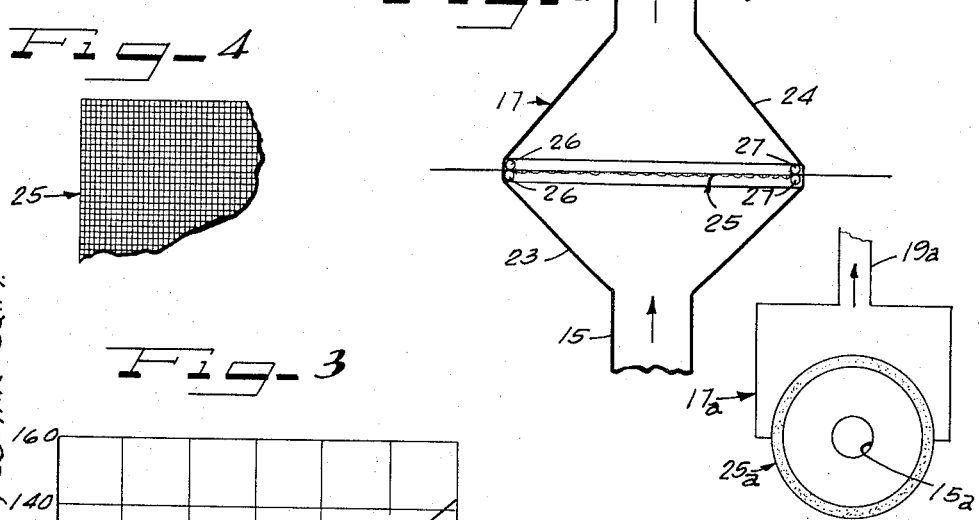
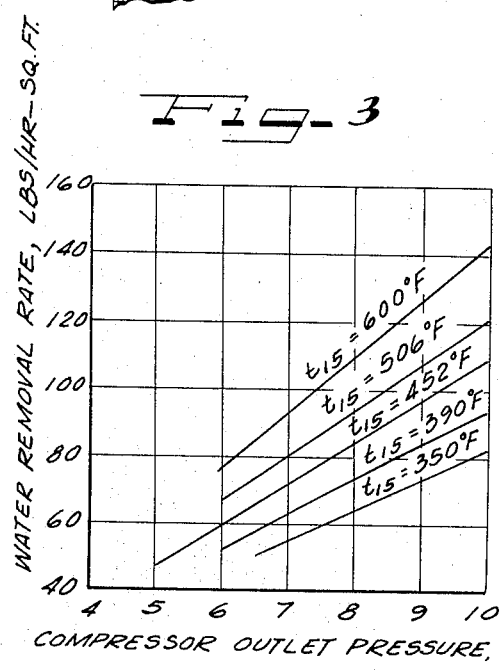
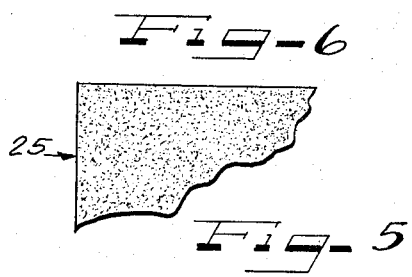

3,362,080
THROUGH DRYING OF PAPER
Robert A. Daane, Rockford, Ill., assignor to Beloit Corporation, Beloit, Wis., a corporation of Wisconsin
Filed Feb. 14, 1966, Ser. No. 527,247
9 Claims. (Cl. 34—23)

ABSTRACT OF THE DISCLOSURE

Method and apparatus for drying paper by passing pressurized heated air through an air flow resistance and the paper supported on the air flow resistance. The air is compressed adiabatically in the compressor of a gas turbine and as it is passed into and through the air flow resistance and paper, the moisture in the air is removed and the heat lost in the air passing through the paper is regained by passing the air through a regenerator receiving heat from the exhaust gases of the turbine. The air is then cycled to the combustion chamber of the turbine and through the turbine and back through the regenerator, where it may be exhausted to atmosphere or may pass to the air intake of the compressor.

Background of the invention

This invention relates to improvements in methods and apparatus for drying paper and the like.

The moist paper coming from the press section of a paper making machine has heretofore been dried by passing hot air directly through the paper at atmospheric pressure. Such drying processes, however, have never come into wide commercial use particularly where it is required to dry at a rapid rate, due to two disadvantages, which are, first, the high power requirements necessary to dry the paper at the required rate, and second, the non-uniformity of drying, caused by the channeling of the air flow through spots which happen to dry first, with subsequent deficient air flow through the wet spots.

Pressurized through drying has been favorably considered due to the basic physical advantage of through drying under high pressure, which is that the pumping power which must be supplied to maintain a desired mass flow rate of a fluid through a finely porous material varies inversely with the square of fluid density. Although the mass flow rate required to maintain a desired drying rate increases somewhat as the air pressure increases, partially offsetting the gain from the density increase, a substantial net gain is attained from pressurizing the air.

A through drying system entirely pressurized, in which the air is recirculated is suggested by this, but such a closed loop arrangement requires the use of a dessicant or other water removal system for the gas.

It has been found, however, that the advantages of high air density in open-loop drying can be attained by bringing atmospheric air to the desired density in the compressor of a gas turbine, which also brings the air temperature to the value desired for drying.

Although the initial compression process requires a substantial amount of power, a substantial amount of this power is recovered after the air has passed through the paper by expansion in a turbine, which may be considered as a pressure energy recuperator for the system.

The conventional gas turbine cycle has a combustion chamber before the turbine, in which at least enough thermal energy can be added to provide the required compressor input. The only energy input to the system is the fuel supplied to the combustion chamber. Where more energy is added in the combustion chamber, the excess shaft power made available can be used to generate electricity.

The first disadvantage is, therefore, remedied by utilizing the output of the compressor of a gas turbine, to provide air pressurized to several atmospheres.

It has also been found that the disadvantage of small-scale non-uniformity of drying has been alleviated by the addition of an air flow resistance in the form of a fine mesh screen, or other porous member in series with the paper. This porous member may also be used to support the sheet being dried, and may move with the paper web in certain instances.

Such a drying process results in a marked reduction in size of the dryer, with a resultant reduction in cost of the dryer and drying process over conventional drying systems and provides a simpler dryer eliminating the need for felts formerly required in conventional drying systems.

Summary of invention and objects

A principal object of the present invention, therefore, is to provide a new and improved method and apparatus for the through drying of paper, in which pressurized heated air passing through the paper is obtained from the compressor of a gas turbine and wherein non-uniformity in drying is cured by supporting the paper for movement along an air flow resistance in series with the paper.

Another object of the invention is to provide a new and improved method of drying paper in which hot air is passed through the paper in the circuit from the compressor to the combustion chamber of a gas turbine and in which the paper is drawn through the closed system along a uniform and fixed flow resistance, free from changes by shrinkage or the presence of moisture.

A still further object of the invention is to provide an apparatus for the through drying of paper in the form of a gas turbine having a drying hood in the circuit from the compressor to the combustion chamber of the turbine and having a uniform and fixed air flow resistance extending along the hood, forming a support for the paper as it moves through the hood and uniformly dispersing the flow throughout the total area of the paper.

These and other objects of the invention will appear from time to time as the following specification proceeds and with reference to the accompanying drawings wherein:

FIGURE 1 is a flow diagram of a closed circuit gas turbine diagrammatically showing a hood and air flow resistance in the circuit from the compressor to the combustion chamber of the turbine;

FIGURE 2 is a diagrammatic view diagrammatically showing a form of hood which may be used in carrying out the principles of the present invention;

FIGURE 3 is a graph showing the water removal rate in pounds per hour per square foot of paper as a function of compressor outlet pressure at various air temperatures;

FIGURE 4 is a diagrammatic view showing a form of air flow resistance that may be used in carrying out the principles of the present invention;

FIGURE 5 is a diagrammatic view showing another form of air flow resistance that may be used; and FIGURE 6 is a fragmentary diagrammatic view showing a modified form of hood and air flow resistance which may be used in carrying out the principles of the present invention.

In the drawings, I have shown for illustrative purposes in FIGURE 1, a diagrammatic showing of a conventional gas turbine 10 having a shaft 11 driving a compressor 12 in a conventional manner, and also providing the power at the opposite end of the shaft to drive an electric generator or any other power operated device it may be desired to drive.

The compressor 12 has an air intake 13 and a compressed air outlet 15. An intercooler 16 is provided to remove the heat of compression and thereby reduce the work of compression. The outlet 15 supplies air to a dryer hood 17, through which the moist paper is trained to pass at a relatively high rate of speed. An outlet duct 19 leads from the hood 17 to a regenerator 20, which recovers exhaust heat from the turbine and returns the exhaust heat to the cycle. The air then passes to a combustion chamber 21 of the turbine from which recharged ignited gas passes to the turbine through an intake 22, to effect operation of the turbine in a conventional manner.

The hood 17 is diagrammatically shown for illustrative purposes only and includes an intake or lower hood section 23, an outgoing or upper hood section 24 and an air flow resistance 25, which may form a support for the paper as it passes along the hood.

The air flow resistance 25 may be in the form of a fine mesh sheet supporting screen or may be a porous metal or plastic, a moving sand bed (not shown) and may also be a cylinder of porous metal enclosed by a hood, and along which the paper passes, with for continuously cleaning the porous cylinder.

In FIGURE 4 I have diagrammatically shown a portion of a fine mesh sheet supporting screen, and in FIGURE 5 I have shown a section of a permeable material which may be used in place of the screen and which may be a metal or plastic material.

It should be understood that the air flow resistance 25 may be on the incoming or outgoing side of the paper in series with the paper or may be on the incoming and outgoing sides of the paper. The air flow resistance may also move with the paper and be in the form of an endless belt, or in the form of a permeable drum 25a, as diagrammatically shown in FIGURE 6.

The hood 17 is suitably sealed to retain the efficiency of the closed circuit. A pair of power driven rolls 26 is shown in FIGURE 2 for illustrative purposes only, as engaging opposite sides of the paper at the incoming side of the hood. A similar pair of power driven rolls 27 is also shown as engaging opposite sides of the paper at the outgoing end of the hood. The nips between the rolls 26 and 27 may be in direct alignment with the top surface of the screen 25.

The rolls 26 and 27 may be suitably sealed to opposite end walls of the hood and the screen 25 may also be suitably sealed to the lower rolls 26 and 27, to prevent the escape of air along the ends of the screen and to provide a uniform air flow resistance throughout the entire area of the hood.

In the modified form of the invention shown in FIGURE 6 the compressor and turbine circuit are the same as in the form of the invention illustrated in FIGURES 1 and 2. An air flow resistance 25a is shown as moving with the paper and as being in the form of a power driven rotating permeable drum or cylinder, the peripheral portion of which may be made from a permeable metal or plastic or even a fine mesh screen.

In this form of the invention, the outer periphery of the permeable drum 25a is partially wrapped by a hood 17a. Air discharged from the compressor 12 enters the drum through a duct 15a entering the drum through an end thereof and is directed and sealed to the portion of the drum wrapped by the hood in a conventional manner, by air confining means (not shown) commonly used in drum dryers. Air leaves the hood 17a through a outlet 19a and is conducted to the generator 20 and combustion chamber 21 of the turbine as in the form of the invention illustrated in FIGURES 1 and 2. A suitable means (not shown) may be provided for continuously cleaning the porous drum or cylinder 25a.

It may be seen from the schematic diagram of FIGURE 1, that air is taken into the compressor through the inlet 13 at atmospheric temperature, pressure and humidity and is compressed adiabatically to the required atmospheres. The air is then passed through a water-cooled heat exchanger in the form of an intercooler 16, where it is cooled to a predetermined state and then reenters the compressor. The compressed air is then further compressed by adiabatic compression to a final pressure and temperature. At this state, the air is ready to be passed through the paper in the through drying operation. The air in this state is then passed into the hood 17 through the air flow resistance 25 and through the paper and out through the duct 19 to the regenerator 20.

The graph of FIGURE 3 shows the water removal rate of the system as a function of compressor outlet pressure at various air temperatures, where the pressure drop through the paper and screen is in this example, two atmospheres. This graph shows how the water removal rate varies with the pressure ratio for various air temperatures with a constant screen factor and pressure drop and demonstrates the effectiveness of through drying in a closed system under pressure and shows the rapid increase in water removal rate as the compressor outlet pressure is increased with a resultant increase in temperature of the air at the outlet from the compressor.

The air in the outlet duct 19 leaving the dryer hood 17 is lower in both temperature and pressure but higher in moisture content then when it entered the paper. This air then flows through the regenerator 20 where it receives heat from the turbine exhaust gases. From the regenerator 20, the air is cycled to the combustion chamber 21 and through the turbine and back through the regenerator to atmosphere, in a manner similar to the conventional gas turbine cycle with intercooling.

It should be noted, however, that the difference of the present drying cycle from the gas cycle of the conventional turbine is that an intermediate temperature of the air after passing through the intercooler 16 is choosen to produce the desired drying temperature in the duct 15, and the pressure and temperature drop through the paper from the duct 15 to the duct 19 has no counterpart in the conventional cycle.

It may be seen from the foregoing that paper may be efficiently dried by passing high density air pressurized to several atmospheres directly through the paper with a resultant shorter dryer section and lower power cost than in a conventional paper machine.

While I have herein shown and described one form in which the invention may be embodied, it may readily be understood that various modifications and variations in the invention may be attained without departing from the spirit and scope of the novel concepts thereof.

I claim as my invention:

1. A method of drying paper by utilizing the air passing through a gas turbine circuit including:
   a gas turbine,
   a compressor driven from said gas turbine and having an inlet and an outlet,
   a regenerator heated by the exhaust gases from the turbine,
   a combustion chamber downstream of the regenerator and having communication therewith,
   and a communicating passageway from the combustion chamber to the intake of the gas turbine, the steps of
      supporting the paper along a confined area downstream of the outlet of the compressor,
      passing the paper to be dried along its supported confined area,
      passing heated air from the outlet of the compressor through the paper along the supported area thereof and uniformly distributing the air along the confined area,
      and maintaining the air passing through the paper under pressure to maintain a high density of the air and effect a rapid uniform distribution of air through the area of the paper passing along the confined area,
      and collecting and conducting the air exhausted through the paper to the regenerator, the combustion chamber and intake to the turbine.

2. The method of claim 1 including the provision of a stationary air flow resistance and supporting the paper for travel along the air flow resistance, confining the air passing from the outlet of the compressor to the total area of the air flow resistance, and then collecting the air exhausted through the air flow resistance and the paper and confining the air for passage to the regenerator and thereby maintaining the air exhausted through the paper under pressure.

3. The method of claim 1 including the provision of a uniform movable air flow resistance and supporting the paper for travel along the movable air flow resistance, confining the air passing from the outlet of the compressor to the area of the air flow resistance contacted by the paper, and conducting the air to the regenerator.

4. In an apparatus for drying paper by the passage of heated air directly through the paper, a hood, means guiding moist paper to pass within and along said hood from one end thereof to the other, a uniform air flow resistance in said hood supporting the paper passing along said hood, an outlet from said hood from one side of the paper, an inlet into said hood at the opposite side of the paper, a regenerator downstream of said outlet, a combustion chamber downstream of said regenerator and having communication therewith, a gas turbine having an inlet and an outlet, a passageway from said combustion chamber to said inlet, a passageway from said outlet to said regenerator, a compressor having an air inlet and an air outlet, a drive from said turbine to said compressor, a passageway from said outlet from said compressor to said inlet to said hood, for supplying heated air under pressure to said hood to pass through said air flow resistance and the paper thereon, and a passageway from said outlet from said hood to said regenerator for maintaining said outlet under pressure and regenerating the air exhausted through the paper.

5. The apparatus of claim 4, wherein the air flow resistance is endless and is mounted to move with the paper and is made from an air permeable material.

6. The apparatus of claim 4, wherein the air flow resistance comprises a pair of endless belts of fine mesh screen, and wherein vertically spaced rolls are provided at opposite ends of the hood to train the belts along opposite sides of the paper.

7. The apparatus of claim 4, wherein the air flow resistance is a porous metal cylinder mounted to support and move with the paper.

8. The apparatus of claim 7, wherein the air flow resistance comprises a paper supporting porous plastic cylinder.

9. The apparatus of claim 7, wherein the air flow resistance comprises a paper supporting porous metal cylinder.

References Cited

UNITED STATES PATENTS

| 1,870,971 | 8/1932 | Sundstrom et al. | 34—115 X |
| 2,532,910 | 12/1950 | Hayward | 34—115 X |
| 3,004,347 | 10/1961 | Dobson | 34—86 X |
| 3,246,401 | 4/1966 | Walser et al. | 34—115 X |
| 3,248,802 | 5/1966 | Wagner | 34—95 |

FOREIGN PATENTS

| 672,484 | 5/1952 | Great Britain. |

KENNETH W SPRAGUE, *Primary Examiner.*